United States Patent [19]

Thompson

[11] 4,026,329

[45] May 31, 1977

[54] METHOD AND APPARATUS FOR REMOTELY AND RELEASABLY SEALING A PIPELINE

[75] Inventor: Albert L. Thompson, Houston, Tex.

[73] Assignee: Texas Pipe Line Company, Houston, Tex.

[22] Filed: June 30, 1975

[21] Appl. No.: 591,565

Related U.S. Application Data

[60] Division of Ser. No. 427,777, Dec. 26, 1973, Pat. No. 3,908,682, which is a continuation of Ser. No. 253,386, May 15, 1972, abandoned.

[52] U.S. Cl. .................................. 138/97; 337/140
[51] Int. Cl.² ........................................ F16L 55/12
[58] Field of Search ................. 138/89, 97, 90, 93; 137/1, 15, 315; 15/104.06 B, 104.05; 321/1, 5; 337/140

[56] References Cited

UNITED STATES PATENTS

| 2,083,317 | 6/1937 | Dallenbach | 337/395 |
| 2,929,410 | 3/1960 | Morrison | 138/97 |
| 3,285,290 | 11/1966 | Morrison | 138/97 |
| 3,381,714 | 5/1968 | Johnson | 138/97 |
| 3,483,895 | 12/1969 | Barto | 138/93 X |
| 3,495,626 | 2/1970 | Nagel | 138/97 |
| 3,652,969 | 3/1972 | Willson et al. | 337/140 |

Primary Examiner—Richard E. Aegerter
Assistant Examiner—John W. Shepperd
Attorney, Agent, or Firm—Thomas H. Whaley; Carl G. Ries; Theron H. Nichols

[57] ABSTRACT

Methods for releasably plugging off a section of a pipe line and apparatuses for practicing or carrying out the methods are disclosed. An apparatus comprises one or more pigs, each pig having an inflatable ring therearound, inert gas therein for inflating the ring, and a remote thermal command signal receiver for initiation of expansion of the pigs responsive to a remote thermal command signal of one temperature generated by a generator at the ends of the pipe section to be sealed off for sealing the pigs in the pipe as they reach their respective pipe section termini. The remote command signals comprises thermal energy of precise temperatures.

9 Claims, 5 Drawing Figures

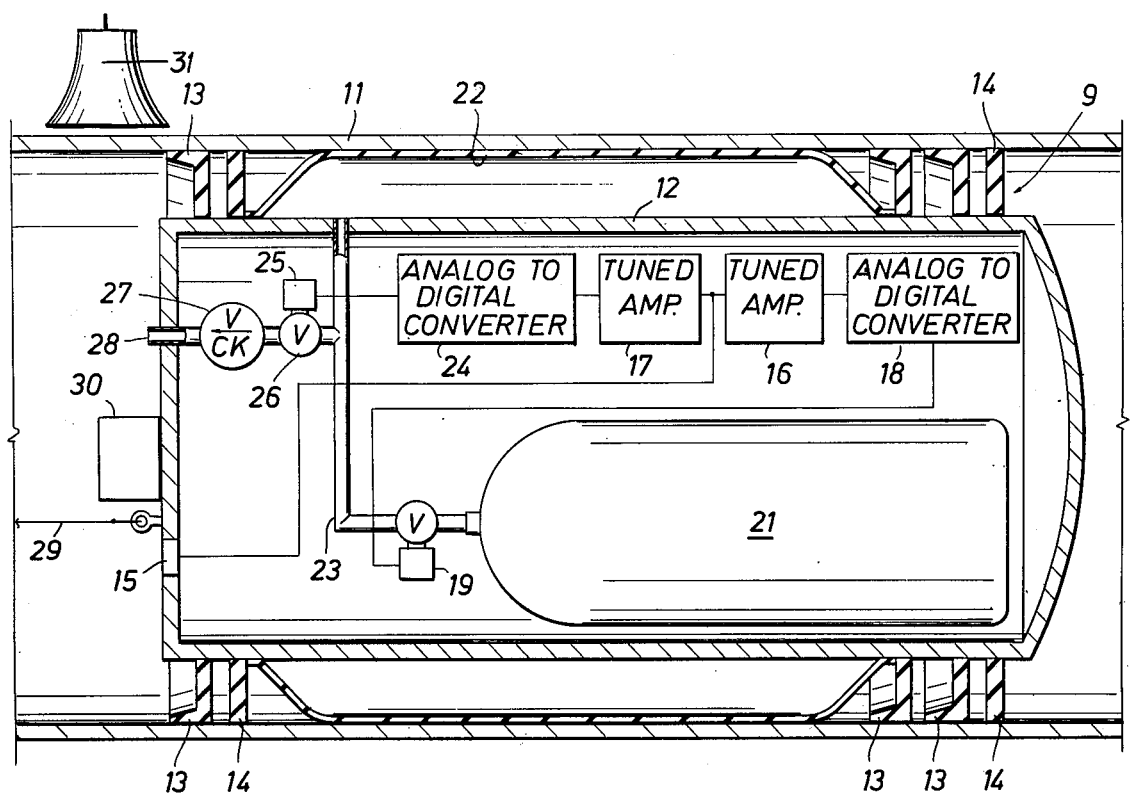

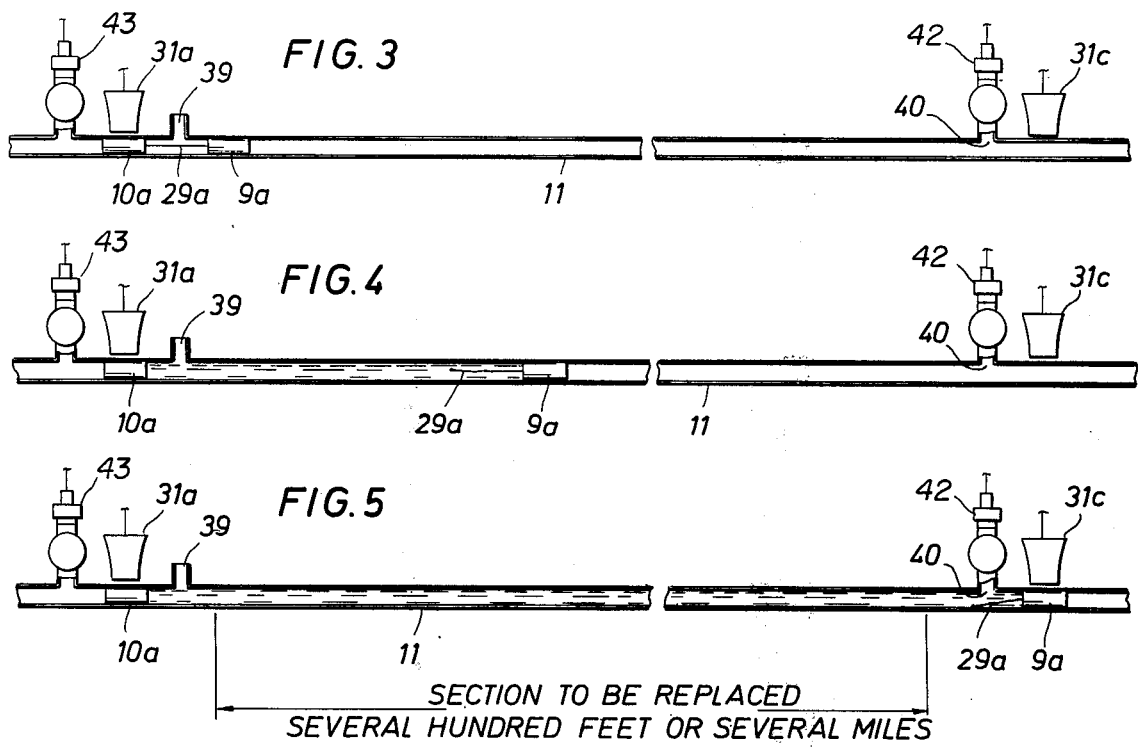
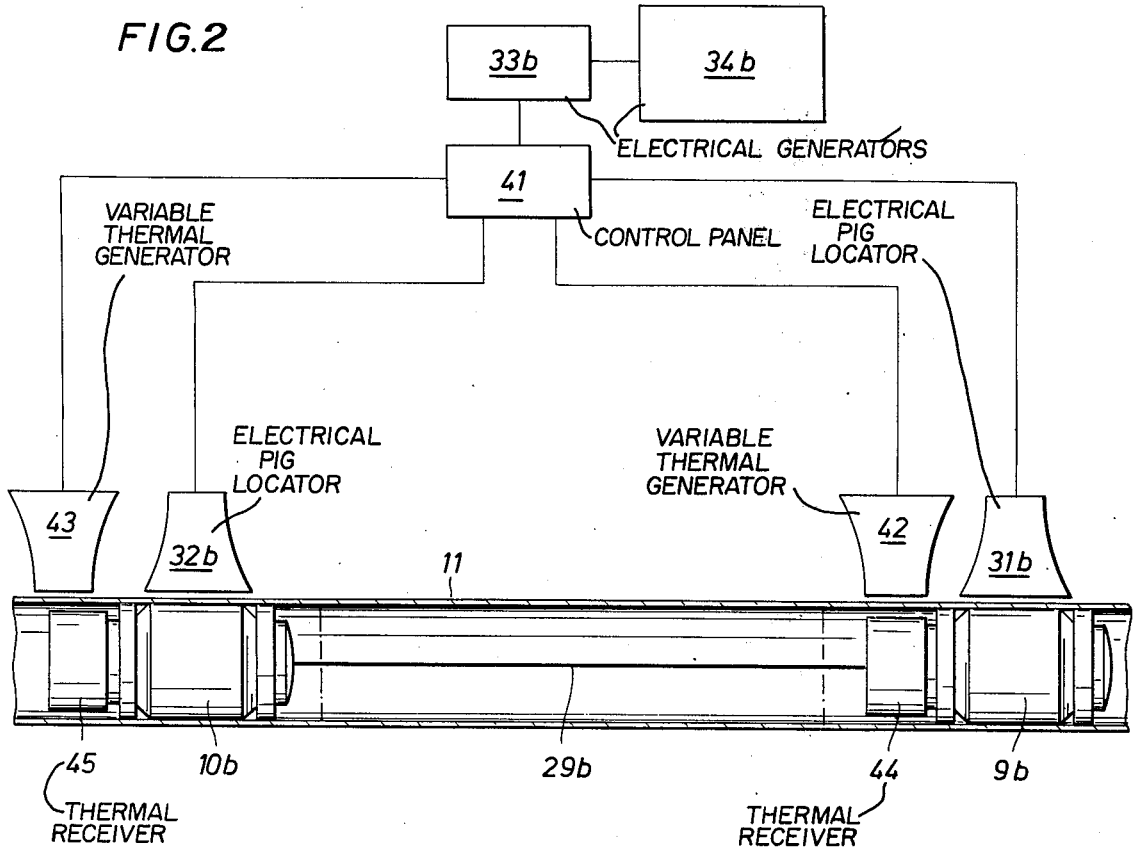

METHOD AND APPARATUS FOR REMOTELY AND RELEASABLY SEALING A PIPELINE

This is a division of application Ser. No. 427,777, filed Dec. 26, 1973, now issued as U.S. Pat. No. 3,908,682 on Sept. 30, 1975 which was a continuation of application Ser. No. 253,386 filed May 15, 1972, now abandoned.

BACKGROUND OF THE INVENTION

The disclosed invention relates to a method and at least one apparatus for plugging fluid or slurry pipe lines preparatoy to making repairs or testing new pipe line installations at selected precise locations.

Many fluids, liquids, and suspended particles or slurries are now transported through pipe lines, such as crude oil, lubricating oil, natural gas, gasoline, and other marketable gases, liquids, and slurries from one area to another. These pipe lines are often of considerably length and over various geographic terrains.

Because of the considerable cost of pipe fittings, as large diameter valves, it is not economical to provide valves every mile or so in pipe lines, but instead, pipe lines may extend for many miles between valves. Accordingly, in the event of damage to a pipe line or the occurrence of the need for modification or structural change to a pipe line at a given point, a very serious problem arises as to the manner in which the flow of liquid through the pipe line is to be controlled during repair or alteration.

If a break occurs in the center of a fifty mile pipe line that could be temporarily repaired such that flow could be resumed, even at reduced flow rates, or a need arises for modifying the pipe line at this point, it would be completely infeasible to use the existing valves for isolating this section of the pipe line due to the tremendous quantity of fluid therein. If the pipe line were full of crude petroleum, the least valuable liquid likely to be passing through the pipe line, there would still be a body of liquid of tremendous value contained within such a section of pipe, and the economic loss of discarding this liquid and the damage to the ecology could not be tolerated even if a suitable location of disposal could be found. Draining of this section of pipe into tanks, tank cars, or tank trucks, or other portable means or displacing the line with nonpollutants such as nitrogen or water would be very expensive and not very practical. Thus, repair or modification of the pipe line under these conditions, while not impossible, would be a lengthy, time consuming, and expensive operation.

One method to repair pipe lines is thus to evacuate and isolate a section of pipe line by using two internally transportable plugging devices or pigs, some type of means for initially stopping the pair, locating one pig at the upstream terminus of the section to be isolated, and locating the second pig at the downstream terminus of the pipe section isolated. Here the pigs are expanded to seal off the pipe section, with or without flow being maintained through a bypass, the section evacuated, repaired, refilled, and the pigs released and recovered.

While such apparatus are used, all contain various certain objectionable features and the instant invention overcomes such objections. There are those types of pigs utilizing rack and gears for expanding thereof as disclosed in U.S. Pat. No. 2,786,489, but such mechanisms get complicated, are expensive to purchase and maintain, and are of low efficiency. Others have projections into the pipe to contact and expand the pig as disclosed in U.S. Pat. Nos. 2,339,544, 2,929,410, 3,040,779, and 3,285,290. Other pigs responsive to only one signal are disclosed in U.S. Pat. Nos. 3,298,399; 3,381,714; 3,401,720; 3,483,895; 3,690,348 and 3,837,214. Another system utilizes a large expensive full encirclement fitting for being welded on the line. This "one shot" attachment to a high pressure pipe line must be coated and cathodically protected, as well as physically protected, during the life of the parent facility. Another system involves a sophisticated series of fittings for being welded on the line in order to trap and lock two hydraulically expandable pigs into position. The usual and most common method deemed to be used to cease flow in a pipe line temporarily is the utilization of the T. D. Williamson "Stopple" plugging systen which comprises boring a large hole at each of the two extremities of the pipe section to be worked on, inserting a plug in each large hole and pivoting the plug about a transverse axis to plug-up the pipe, and after the repair work is done, the plugs are pivoted back and removed from the holes, and large permanent flanges secured over the holes. Even after the pipe section is repaired in the above cases, the series of fittings remain on the line and must be protected against physical or cathodic damage as in the above described system.

OBJECTS OF THE INVENTION

Thus a primary object of this invention is to provide a few methods for sealing off a section of pipe having none of the above disadvantages by utilizing remotely propagated energy signals, particularly thermal.

Another primary object of this invention is to provide a few apparatuses for practicing the above methods for sealing off a section of pipe.

A still further object of this invention is to provide a pig with a thermal receiver responsive to a thermal generator on the pipe line for sealing the pipe line at a precise location with the pig.

Another object of this invention is to provide a releasable internal seal or pig for a pipe line which is easy to operate, is of simple configuration, is economical to build and assemble, and is of greater efficiency for plugging a section of a pipe line for repair, modification, or pressure testing.

Other objects and various advantages of the disclosed methods and apparatuses for releasably sealing a pipe line will be apparent from the following detailed description, together with accompanying drawings, submitted for purposes of illustration only and not intended to define the scope of the invention, reference being had for that purpose to the subjoined claims.

BRIEF DESCRIPTION OF THE DRAWINGS

The drawings diagrammatically illustrate by way of example, not by way of limitation, a few forms or mechanisms for carrying out the methods of the invention wherein like reference numerals have been employed to indicate similar parts in the several views in which:

FIG. 1 is a schematic enlarged sectional view of the new pig;

FIG. 2 is a schematic block diagram sectional view of two pig locating means on the pipe line adjacent to the pipe section to be sealed off by the pigs; and FIGS. 3 – 5 are schematic illustrations of another modification of the invention.

DESCRIPTION OF THE INVENTION

The invention disclosed herein, the scope of which being defined in the appended claims, is not limited in its application to the details of construction and arrangement of parts shown and described for carryout the disclosed methods, since the invention is capable of other embodiments for carrying out other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE METHODS

This invention comprises a few methods for releasably sealing off a section of a pipe line and a few mechanisms for practicing the methods.

The basic method here disclosed comprises, 1. mounting a thermal generator on the pipe at the precise location of the desired seal, 2. transporting a pipe internal sealing means having a thermal receiver for actuating the sealing means in the moving fluid of the pipe towards the precise location, and 3. passing the thermal receiver contiguous with the thermal generator for actuating the pipe internal sealing means for sealing the pipe at the precise location.

In greater detail, the method for sealing off a section in a pipe of moving fluid comprises the more detailed steps of, 1. mounting a thermal generator of one heat range at the upstream terminus of the pipe section to be sealed off, 2. mounting a thermal generator of another heat range at the downstream terminus of the pipe section, 3. mounting a thermal receiver on an upstream internal sealing means of a heat range compatible with the upstream thermal generator for actuation thereby, 4. mounting a thermal receiver on a downstream internal sealing means of a heat range compatible with the downstream thermal generator for actuation thereof, 5. interconnecting the two internal sealing means at a spaced apart distance substantially equal to the length of the section of pipe to be sealed off, 6. transporting both interconnected sealing means in the moving fluid of the pipe toward the upstream and downstreams termini, 7. sealing the pipe at the upstream terminus of the pipe section as the upstream thermal receiver arrives at the upstream thermal generator by actuating the upstream internal sealing means, and 8. sealing the pipe at the downstream terminus of the pipe section as the downstream thermal receiver arrives at the downstream thermal generator by actuating the downstream internal sealing means.

Another method comprises changing steps (1) to (4), (7), and (8) to the two steps of, a. mounting a thermal generator between or at either of the termini of the pipe section, and b. sealing the pipe at both termini of the pipe section as the thermal receivers arrive at their respective termini in the area of the thermal generator.

A further method for sealing off a section of pipe with two interconnected sealing pigs comprises the steps of 1. generating a first thermal command signal for sealing the aft pig at the upstream end of the pipe section to be sealed off, 2. generating a second thermal command signal for disconnecting the forward pig, 3. introducing a second fluid intermediate the two pigs for transporting the forward pig to the downstream end of the pipe section to be sealed off, 4. generating a third thermal command signal for sealing the pipe with the forward pig at the downstream end of the pipe section to be sealed off, 5. generating a fourth thermal command signal for unsealing the aft pig for allowing it to push the second fluid out an opening at the upstream end of the forward pig, and 6. generating a fifth thermal command signal for unsealing the forward pig as the unsealed aft pig arrives adjacent thereto so that both pigs may continue downstream for recovery.

Still another method for sealing off a section of pipe with two internal pipe sealing pigs moving with the pipe fluid toward the pipe section comprises the steps of, 1. generating a first thermal command signal for sealing the upstream end of the pipe section with the aft pig, 2. generating a second thermal command signal for sealing off the pipe section at the downstream end with the forward pig, 3. generating a third thermal command signal for unsealing the aft pig for allowing it to travel down to the downstream end of the pipe section, and 4. generating a fourth thermal command signal for unsealing the forward pig for allowing both pigs to travel downstream for recovery.

DESCRIPTION OF AN APPARATUS — MODIFICATION I

FIGS. 1 and 2 disclose schematically an apparatus for practicing at least one of the methods of the invention described above, FIG. 1 disclosing a pipe sealing means containing a thermal signal receiver and FIG. 6 disclosing a pipe sealing actuating device mounted on a pipe line at a precise point containing a thermal signal generator for generating a command signal to the thermal signal receiver for actuation thereof for sealing the pipe line at the precise point.

FIG. 1, a schematic cross-sectional view, illustrates one, 9, of the two similar pipe plugging devices or pigs 9 and 10 for being transported internally of a pipe 11 of a long pipe line. Pig 9, for example, comprises a cylindrical housing 12 with fore and aft annular push cups and disk guides, 13 and 14, respectively, of conventional design for supporting the ends of the pig centered in the pipe, and for maintaining a pressure differential for transporting the pig in the pipe line. A thermal receiver 15 in the rear end of the pig 9, for example, converts, a thermal signal to an electrical signal for transmission to the tuned amplifiers 16 and 17. Amplifier 16 passes a signal of one heat range to analog-to-digital converter 18 to close a switch to connect an electrical source, as a battery, to a relay 19 on solenoid valve 20 for instantly opening a tank 21 of inert gas, as nitrogen, to fill and expand an inflatable annular chamber ring 22 through suitable conduits 23. This inflated annular ring in combination with pig 9 plugs or seals the pipe for preventing any fluid in the pipe 11 from passing in either direction past the pig 9.

Tuned amplifier 17, FIG. 1, is responsive to a second heat range for activating through analog-to-digital converter 24 a second relay 25 for opening a second solenoid valve 26 for exhausting the gas from annular chamber ring 22 through a check valve 27, and out the exhaust nozzle 28 into the pipe of fluid. A flexible line, as a stainless steel cable 29 interconnects the two pigs to insure that they not become separated too far and is approximately 20 feet longer than the pipe section to be removed.

The push cups and disk guides 13 and 14, respectively, of the lead pig 9 are as tight and leak proof as practical and yet permit easy movement of the pig through the pipe for pulling the aft pig 10, FIG. 2, which has smaller diameter cups and guides for insuring that fluid flows past the aft pig to maintain the higher fluid pressure against the forward pig. Thus, the lead pig 9 maintains the line 29 taut as it pulls the aft pig 10 the correct precise distance behind.

A pig detection system, if desired, is illustrated in FIGS. 1 and 2 as comprising an electronic transmitter 30, FIG. 1, on the aft end of the pig, such as but not limited to, an electronic transmitter like Model 150, manufactured by Heath Survey, Wellesley Hills, Mass. Intermittent transmission of the transmitter is detected by a conventional compatible Heath electronic pig locator or receiver 31, FIG. 2, above the ground in the locality of the section of pipe to be removed.

FIG. 2 discloses the system for commanding the internal sealing plugs or pigs to seal off a portion of the pipe line to be removed and worked on, replaced, or tested. This system comprises variable thermal generators 33b, 34b or if desired a 115 volt A.C. generator, for example, driven by a gasoline engine, for example. Conventional variable thermal generators, as 42 or 43 transmits the thermal energy directly into the pipe of fluid to be received by the thermal receivers 15 on the pigs nearby. After the pipe work is finished, a second signal or a second thermal level from the thermal generator 42 actuates relay 25, FIG. 1, through tuned amplifier 17 and analog-to-digital converter 24 to open valve 26 to exhaust the fluid from the annular chamber 22 to deflate the chamber and release the sealing action of the pig. Check valve 27 prevents back flow of fluid from exhaust nozzle 28 back into the pig.

While the electronic pig locator receiver 31b, FIG. 2, is illustrated connected directly to the control panel 41 for operation thereof for operation thereof for instantly expanding the pigs when the lead pig arrives in position as shown in FIG. 2, the thermal generator may be manually operated, if desired, upon arrival of the pigs as seen from the electronic pig location or receiver 31 in an emergency or if so desired.

The above disclosed embodiment operates in the following manner in carrying out or practicing one of the methods of the invention.

The variable thermal generator FIG. 2, and connecting pipes are mounted on the pipe line adjacent to the area required to be removed, tested, or repaired and the electronic pig locator 31b is mounted at the precise location just downstream of the section of pipe to be removed and where it is desired to stop the lead pig 9b and seal the pipe. The two interconnected pigs are inserted in the pipe line at the nearest upstream scraper trap. As the leading pig approaches the work site as detected by the electronic pig locator 31b receiving the intermittent signal from the head pig's transmitter 30, the fluid pipe pump or compressor station is ordered to decrease the flow to a slow rate of flow. As the lead pig arrives at the electronic pig locator, a command signal, as the ultrasonic signal is transmitted through the pipe of fluid and the inflatable annular bags of both pigs are instantly inflated and the station ordered to cease flow in the pipe line. After the pigs are thus stopped in the desired position on each side of the section of pipe to be removed, a vacuum truck hose, for example, (not shown) is attached, and the isolated pipe section is evacuated. After all repairs, testing, etc., are completed, the fluid is returned to the pipe line via the vacuum truck hose and the operation is reversed until the pressure is equalized on both sides of the pigs. Another thermal signal is transmitted to deflate the pigs by exhausting their inert gas into the pipe line and floated downstream for recovery at the next downstream scraper trap. Likewise, the pump station resumes pumping to restart fluid flow and to speed the pigs on their way downstream.

MODIFICATION II

FIGS. 3, 4, and 5 illustrate schematically the operation of a pipe plugging system for several hundred feet to several miles of pipe to be repaired, replaced, pressure tested, etc., where it would be uneconomical to maintain a tether for interconnecting the two pigs.

FIG. 3 illustrates the conventional electrical pig detection system 31a, similar to 31 of FIG. 1, for detecting the correct position of the aft pig 10a and pig stopping command signaling element 35a similar to variable thermal generator 43 of FIG. 2, for sealing the pipe at the desired location wherein only the aft pig 10a, FIG. 3, is responsive to a first expanding command signal. Likewise, only the aft pig 10a is responsive to a second command signal from the aft thermal generator 43 for unlatching the tether 29a.

Then a nitrogen gas, water, or other desired fluid is pumped in opening 39, FIGS. 3–5, for forcing the forward pig 9a downstream. It is stopped with a different first command signal at the proper and desired point, FIG. 5, with similar downstream pig detecting and thermal generator actuating elements 31c and 42, respectively, thus isolating the entire relatively long section of pipe line.

After the long pipe section is repaired or tested, the downstream pipe opening 40 is opened, the aft pig 10a is released by a third command thermal signal from the upstream thermal generator 42 to displace the gas or water from the pipe section through downstream opening 40, the opening closed again simultaneously with releasing of the fore pig 9a responsive to a second command thermal signal from the downstream thermal generator 42, and the two pigs recovered at the first scraper trap downstream.

MODIFICATION I

FIG. 2 illustrates schematically the invention for practicing the methods comprising a thermal command actuating system illustrated in FIGS. 1 and 2.

In FIG. 2 conventional electrical pig locators or receivers 31b and 32b are illustrated as representing the pig detection system for actuating a conventional control panel 41 for controlling their respective variable thermal or heat generators 42 and 43. The electrical generators 33b,34b are connected to the heat generators through panel 41 for supply of adequate current to the heat generators 42 and 43. Aft pig 10b has a heat detector or large thermocouple 45 responsive to one temperature for operating its compressed gas or nitrogen tank solenoid valve for expanding the inflatable annulus around the aft pig for sealing it in the pipe at the location of the variable heat generator 43. Likewise, forward pig 9b has a heat detector or large thermocouple 44 responsive to a second and higher temperature for operating the compressed nitrogen tank solenoid valve for expanding the inflatable annulus around the fore pig 9b. For releasing the pigs, 9b and 10b the two thermocouples 44 and 45, respectively, are responsive to a third and higher temperature from their respective heat generators 42, 43 for operating the deflation solenoid valves for unsealing the respective pigs.

OPERATION OF MODIFICATION I

The two conventional electrical pig detectors 31b and 32b, FIG. 6, are positioned on the pipe 11 just outside the extremities of the section of pipe to be removed, worked on, or tested, etc., and the two variable heat generators 42, 43 are positioned just upstream and adjacent to their pig detectors. As the two interconnected pigs are transported down the pipe with the fluid flow therein, the first pig 9b passes by heat generator 43 as its thermocouple 44 is set for actuation by the higher temperature and is accordingly operated by the downstream hotter thermal generator 42. Practically simultaneously, the second pig 10b arrives at its precise location as indicated by immediate detection by thermocouple 45 and expansion of the annulus around the pig to seal off the pipe. The pig detectors 31b, 32b indicate the approach of the pigs and switch on the thermal generators 42, 43, if they are not already on, and likewise confirm that the pigs have arrived.

The pumps on the pipe line are shut down, the work or testing done on the pipe section after evacuating the pipe section as in the modification of FIGS. 1 and 2, if so desired. The pigs are deflated by a third and higher temperature from the two heat generators 42, 44, by a suitable manual control on the panel 41, fluid flow is resumed, and the pigs are recovered downstream at the next scraper trap.

Accordingly, it will be seen that the disclosed methods and apparatuses for releasably plugging a pipe line operate in a manner which meets each of the objects set forth hereinbefore by allowing sealing off of a section of a pipe line with accurate and precise locating and control of one or two pipe sealing, inflatable pigs.

While several methods of the invention and two mechanisms for carrying out the methods have been disclosed, it will be evident that various other methods and modifications are possible in the arrangement and construction of the disclosed methods and apparatus for releasably sealing a pipe line without departing from the scope of the invention and it is accordingly desired to comprehend within the purview of this invention such modifications as may be considered to fall within the scope of the appended claims.

I claim:

1. A method for sealing off a long section of pipe having two internal pipe sealing pigs moving with the pipe fluid toward the long section comprising the steps of, a. generating a first thermal command signal of one temperature at the upstream end of the pipe section for sealing the pipe section with an aft pig responsive to the one temperature at the upstream end of the pipe section to be sealed off, and
   b. generating a higher thermal command signal of a second temperature higher than the first temperature for sealing the pipe with the forward pig responsive to the higher second temperature at the downstream end of the pipe section to be sealed off.

2. A method as recited in claim 1 wherein the two sealing pigs are interconnected comprising the additional steps after the first step of, a. generating at the upstream end of the pipe section a third thermal command signal of a third temperature higher than the first temperature for disconnecting the forward pig responsive to said third temperature after the aft pig has sealed the pipe, and
   b. introducing another fluid intermediate the two pigs for transporting the forward pig to the other and downstream end of the pipe section to be sealed off.

3. A method as recited in claim 1 comprising the additional step of, a. generating a third and higher thermal command signal of a third temperature at the upstream end of the pipe section for unsealing the aft pig responsive to said third temperature for allowing it to travel downstream to the forward pig.

4. A method as recited in claim 3 comprising the added step of, a. generating at the downstream end of the pipe section a third and higher thermal command signal of a third temperature higher than the second temperature at the downstream end of the pipe section for unsealing the forward pig responsive to said third temperature as the unsealed aft pig arrives at the downstream end of the pipe section so that both pigs may continue downstream for recovery.

5. A pipe mechanism for sealing off a section of pipe of moving fluid comprising, a. two pigs positioned in the pipe of moving fluid at a predetermined distance apart,
   b. expanding means on each of said pigs for releasably sealing said pigs in the pipe for sealing off the pipe section between said pigs,
   c. variable thermal generator means at each end of said section of pipe to be sealed off for generating thermal command signals of two different precise temperature levels,
   d. thermal receiver means in each of said pigs, each thermal command signal receiver means being compatible with a different thermal command signal generator means and responsive to its two temperature level thermal command signals for controlling said expanding means for releasably sealing said pigs in the pipe, and
   e. each of said thermal command signal receiving means being responsive to one of said two temperature levels of its respective compatible variable thermal command signal generating means for sealing said pigs at said pipe section for work thereon.

6. An apparatus as recited in claim 5 wherein said thermal command signal receiver means comprises, a. a different thermal command signal receiver mounted on each pig and each thermal command signal receiver being connected to its respective inflatable means on its respective pig for actuation thereof, and b. each thermal command signal receiver being responsive to a thermal command signal of a different temperature level generated by its respective variable thermal command signal generator for releasably sealing its pig in the pipe at the precise location of its thermal command signal generator.

7. A releasable plugging apparatus for a pipe comprising, a. two interconnected pigs having expanding means on each pig for releasably sealing the pigs in the pipe, two thermal command signal generator means, and thermal command signal receiver means thereon each of said pigs for controlling each of said expanding means, b. each of said thermal command signal receiver means being responsive to a thermal command signal of a different temperature generated by each of said thermal command signal generator means for releasably sealing each of said interconnected pigs in the pipe, and c. each of said thermal command signal receiver means being responsive to a higher thermal command signal generated by each of said thermal command generator means for unsealing each of said interconnected pigs in the pipe.

8. A releasable sealing apparatus for a pipe comprising, a. pipe internal sealing means having expanding means for releasably sealing the internal sealing means in the pipe and remote command thermal signal receiver means thereon for controlling said expanding means, b. said remote command thermal signal receiver means being responsive to a first command thermal signal of a particular temperture level for actuating said expanding means for releasably sealing the pipe, c. remote command variable thermal signal generator means at a precise location on the pipe, d. said remote command thermal signal generator means generates said first remote command thermal signal of a particular temperature level, and e. said remote command thermal signal reciever means being responsive to said first command thermal signal generated by said remote command thermal signal generator means for releasably sealing said internal sealing means in the pipe.

9. A releasable sealing apparatus as recited in claim 8 wherein, a. said remote command thermal signal receiver means is responsive to a second command thermal signal of a higher temperature level generated by said remote command variable thermal signal generator means for unsealing said internal sealing means in the pipe.

* * * * *